US012631313B2

(12) United States Patent
Bianchi et al.

(10) Patent No.: US 12,631,313 B2
(45) Date of Patent: May 19, 2026

(54) LIGHT GUIDE AND ASSOCIATED ELECTRICAL DEVICE

(71) Applicant: Schneider Electric Industries SAS, Rueil-Malmaison (FR)

(72) Inventors: Thomas Bianchi, Grenoble (FR); Shreenath Narayanan, Kerala (IN); Youssef Yousfi, Puymoyen (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 19/087,739

(22) Filed: Mar. 24, 2025

(65) Prior Publication Data

US 2025/0306261 A1 Oct. 2, 2025

(30) Foreign Application Priority Data

Mar. 28, 2024 (IN) ............................ 202411025291

(51) Int. Cl.
*F21V 7/00* (2006.01)
*F21V 5/04* (2006.01)

(52) U.S. Cl.
CPC .............. *F21V 7/0091* (2013.01); *F21V 5/04* (2013.01); *F21V 5/048* (2013.01)

(58) Field of Classification Search
CPC . F21K 9/061; F21V 5/04; F21V 5/048; F21V 7/0091
See application file for complete search history.

(56) References Cited

U.S. PATENT DOCUMENTS

| | | | | |
|---|---|---|---|---|
| 2006/0262539 A1* | 11/2006 | Goulet | F21V 7/0091 362/800 |
| 2012/0033441 A1* | 2/2012 | Sousek | F21S 43/14 362/555 |
| 2015/0241616 A1* | 8/2015 | Bungenstock | G02B 6/0018 362/511 |
| 2021/0278060 A1* | 9/2021 | Shima | F21K 9/278 |
| 2025/0327560 A1* | 10/2025 | Saarnio | F21V 5/008 |

* cited by examiner

*Primary Examiner* — Keith G. Delahoussaye
(74) *Attorney, Agent, or Firm* — Wolf, Greenfield & Sacks, P.C.

(57) ABSTRACT

The light guide (110) includes a body (120) having a substantially plane exit surface (112) and an entrance surface (122) configured to capture an incident light flux (F106) emitted by a light-emitting diode (106). The entrance surface (122) includes a central face (124) astride a median plane (M120) and, on each side of the median plane (M120), a first lateral face (131) and a second lateral face (132), so that the incident light flux (F106) is divided into three distinct light fluxes. The body (120) further includes external reflecting faces, each configured to reflect light fluxes associated with each lateral face toward the exit surface (112).

14 Claims, 6 Drawing Sheets

LIGHT GUIDE AND ASSOCIATED ELECTRICAL DEVICE

CROSS-REFERENCE TO RELATED APPLICATIONS

This application claims the benefit of and priority under 35 U.S.C. § 119 to Indian Patent Application 202411025291, filed on Mar. 28, 2024. This application also claims the benefit of and priority under 35 U.S.C. § 119 to French Patent Application No. 2404183, filed on Apr. 23, 2024.

The invention relates to a light guide for an electrical device and to an electrical device comprising such a light guide.

We are interested here in electrical or electronic devices including an indicator light illuminated by one or a plurality of LEDs, an acronym for light-emitting diodes. The indicator light is located on a front side of the electrical device, in order to indicate to the user operating states of the electrical device. The LED(s) are generally arranged on an electronic board, the electronic board being housed in an isolating housing of the electrical device, so as to guarantee a minimum isolation distance between the electrified components of the electrical device and the user.

It is known how to use a light guide made of an electrically insulating material, so as to guide the light emitted by the LED to the front face of the electrical device. An entrance surface of the light guide is located opposite the LED, whereas an exit surface of the light guide forms the indicator light. The exit surface is generally orthogonal to an axis of length of the light guide. The entrance surface is arranged opposite the LED, so as to capture a flux of light emitted by the LED, whereas the exit surface is at a distance from the LED—and by extension at a distance from the entrance surface—by a minimum distance. For example, the standard IEC 947-1:2019-Tables 13 and 15—defines isolation classes, which correspond to minimum distances to be kept between electrified—or potentially electrified—points and the user. The isolation distances depend in particular on the desired isolation class and the electrical voltage under which the electrical circuit-breaker operates. Within the framework of the present description, two electrical voltage intervals are mainly considered, with a first interval corresponding to a voltage less than or equal to 690 V, and a second interval corresponding to a voltage strictly greater than 690 V. For a voltage greater than 690V, the isolation class 1 imposes a distance in the air greater than 7 mm, and leakage lines greater than 10 mm. The isolation class 2 doubles the distances. For a voltage of less than 690 V, the isolation class 2 requires a distance in air greater than 10 mm.

We are particularly interested in indicator lights with an elongate shape, e.g. an oblong shape. Thereby, the exit surface has an elongate shape along an axis of width. It is known how to arrange a plurality of LEDs next to each other along the axis of width in order to form such an elongate indicator light, however such configuration leads to a high consumption of electrical energy. In order to limit the electrical consumption, it is sought herein to limit as much as possible the number of LEDs used for forming an elongate indicator light, preferably with a single LED.

It is known how to use a light guide generally having a trapezoidal shape, the entrance surface and the exit surface being parallel to each other, the entrance surface being shorter than the exit surface along the axis of width. In a known manner, the longer the light guide, the more homogeneous the output flux, in particular due to the multiple reflections of the light rays on the side walls of the light guide. For example, it is considered that the output flux is substantially homogeneous when the height of the light guide is greater than 2.5 times the width of the exit surface. Such a light guide is, however, relatively bulky, which is not practical.

It is known to add dispersing materials, e.g. in powder form, to the material of the light guide. However, the intensity of the output flux is attenuated as soon as the light guide has a height greater than a few millimeters, which is not desirable, more particularly when the light source is limited to a single LED.

The invention more particularly addresses such problems by proposing a light guide having an elongate exit surface, having a relatively homogeneous output flux, with little light loss, from only one LED.

To this end, the invention relates to a light guide for an electrical device, the light guide comprising a body, which is made of an electrically insulating material, the material comprising a matrix having an refractive index comprised between 1.4 and 1.6 and a light transmission coefficient greater than 90% per millimeter, the body having a prism shape extending along an axis of thickness, the body having, in projection in a plane transverse to the axis of thickness, a section comprising;

- an exit surface, which is geometrically supported by a plane orthogonal to an axis of height and has an elongate shape along an axis of width, the axis of width being orthogonal to the axis of height, the axis of thickness, the axis of width and the axis of height together forming an orthogonal coordinate system,
- an entrance surface, which is configured to capture an incident light flux emitted by a light-emitting diode when the light-emitting diode is located opposite the entrance surface, the entrance surface being aligned with the exit surface along the axis of height, so that the captured light flux emerges mainly from the exit surface,
- the body has a substantially symmetrical shape with respect to a median plane of the light guide, the median plane being orthogonal to the axis of width, wherein:

- the entrance surface comprises:
  - a central face, which lies astride the median plane, the central face having two opposite lateral edges, which are parallel to the axis of thickness, and
  - on each side of the median plane, a plurality of lateral faces, which continue the central face from the lateral edge on the same side of the median plane, the lateral faces including a first lateral face and a second lateral face, the first lateral face being interposed between the central face and the second lateral face,
- on each side of the median plane, and in projection in the transverse plane, the central face, the first lateral face and the second lateral face form angles therebetween, configured such that the incident light flux emitted by the light-emitting diode and passing through the entrance surface is divided, by refraction upon passing the entrance surface, into three distinct light fluxes, the three light fluxes including:
  - a central flux, which corresponds to the portion of the incident light flux refracted upon passing the corresponding portion of the central face, the body being configured so that the central flux opens out onto a central portion of the exit surface, forming a central outgoing flux, a first flux, which corresponds to the portion of the incident light flux refracted upon passing the first lateral face, a second flux, which corresponds to the portion of the incident light flux refracted upon passing the second lateral face, the body also comprises, on each side of the median plane, external reflecting faces, which are interposed between the exit surface and the entrance surface, each external face being associated with a respective lateral face and being configured to reflect the portion of the light flux associated with the corresponding lateral face toward the exit surface, the external reflecting faces including;

a first external reflecting face, which is associated with the first lateral face, and which is configured to reflect the first flux within the light guide, so that the first flux thereby reflected opens out onto a first portion of the exit surface, forming a first outgoing flux, a second external reflecting face, which is associated with the second lateral face, and which is configured to reflect the second flux inside the light guide, so that the second flux thereby reflected opens out onto a second portion of the exit surface, forming a second outgoing flux, the central outgoing flux, the first outgoing flux and the second outgoing flux together form an outgoing flux from the exit surface, on the exit surface, the second portion is interposed between the first portion and the central portion.

By means of the invention, the light guide makes it possible to capture the light flux of a LED and to distribute the light flux thereby captured over the exit surface significantly longer than the LED, with a substantially homogeneous intensity of light for the user. The use of a material with a high transmittance, in other words with good transparency, makes it possible to use only one LED alone, which saves energy.

According to advantageous but non-mandatory aspects of the invention, such a control unit can incorporate one or a plurality of the following features, taken individually or according to any technically permissible combination:

A vector orthogonal to each external reflecting face forms, with an axis orthogonal to the associated lateral face, an angle, greater than a limit angle of reflection $\theta_{lim}$ defined by the formula:

$$\theta_{lim} = \sin^{-1}\left(\frac{1}{N_{120}}\right),$$

where $N_{120}$ is the refractive index of the material of the body of the light guide.

The first lateral face forms an angle comprised between 110° and 130° with the central face, whereas the second lateral face forms an angle comprised between 150° and 180° with the first lateral face.

The body is made of a synthetic, hot-injectable polymer material, preferably made of polycarbonate or acrylic polymethyl methacrylate.

The body has a front and a rear face, which are parallel to the transverse plane and which are oriented opposite each other, the exit face connecting the front face to the rear face, whereas at least on one side of the median plane the body has a pair of recesses, which are provided on the front and rear sides and are arranged symmetrically relative to the transverse plane, and each recess has, in a projection onto the transverse plane, a profile defining three main sides, which include:

a first side, which is delimited by the first flux after reflection onto the first external face, a second side, which is delimited by the second flux after reflection onto the second external face, and a third side, which is delimited by the central flux between the central face and the exit surface.

The recesses of the same pair provide therebetween a thinned portion of the body, while the thinned portion has a thickness, measured along the axis of thickness, comprised between 20 and 50% of a total thickness of the body, preferably comprised between 30 and 40%, more preferably substantially equal to 33%.

The recesses are through and connect the front face to the rear face through the body.

The first side of each recess is polished so as to reflect the first flux after reflection on the first external reflecting [surface].

The invention further relates to an electrical device, which comprises:

a housing, which is made of insulating material and has a front face, a light-emitting diode, which is received in the housing, a light guide such as defined hereinabove, the exit surface opening out onto the front face of the housing, while the entrance surface is situated opposite the light-emitting diode.

Advantageously:

the electrical device is a control unit of an electrical circuit-breaker, the front face being configured to be oriented toward the user when the control unit is in a normal use configuration.

The invention further relates to an electrical circuit-breaker, which comprises:

a cut-off unit, comprising at least one cut-off device and one actuator, where the cut-off device can be tripped by means of the actuator, the electrical device as defined hereinabove, wherein:

the cut-off unit provides a receptacle which opens out onto a front face of the cut-off unit, the control unit is received in the receptacle of the cut-off unit, so that the front face of the control unit is substantially aligned with the front face of the cut-off unit.

The invention will be better understood and other advantages thereof will appear more clearly in the light of the following description of an embodiment of a light guide and of a circuit-breaker according to the principle thereof, given only as an example and made with reference to the enclosed stampings, wherein.

Figure 1:
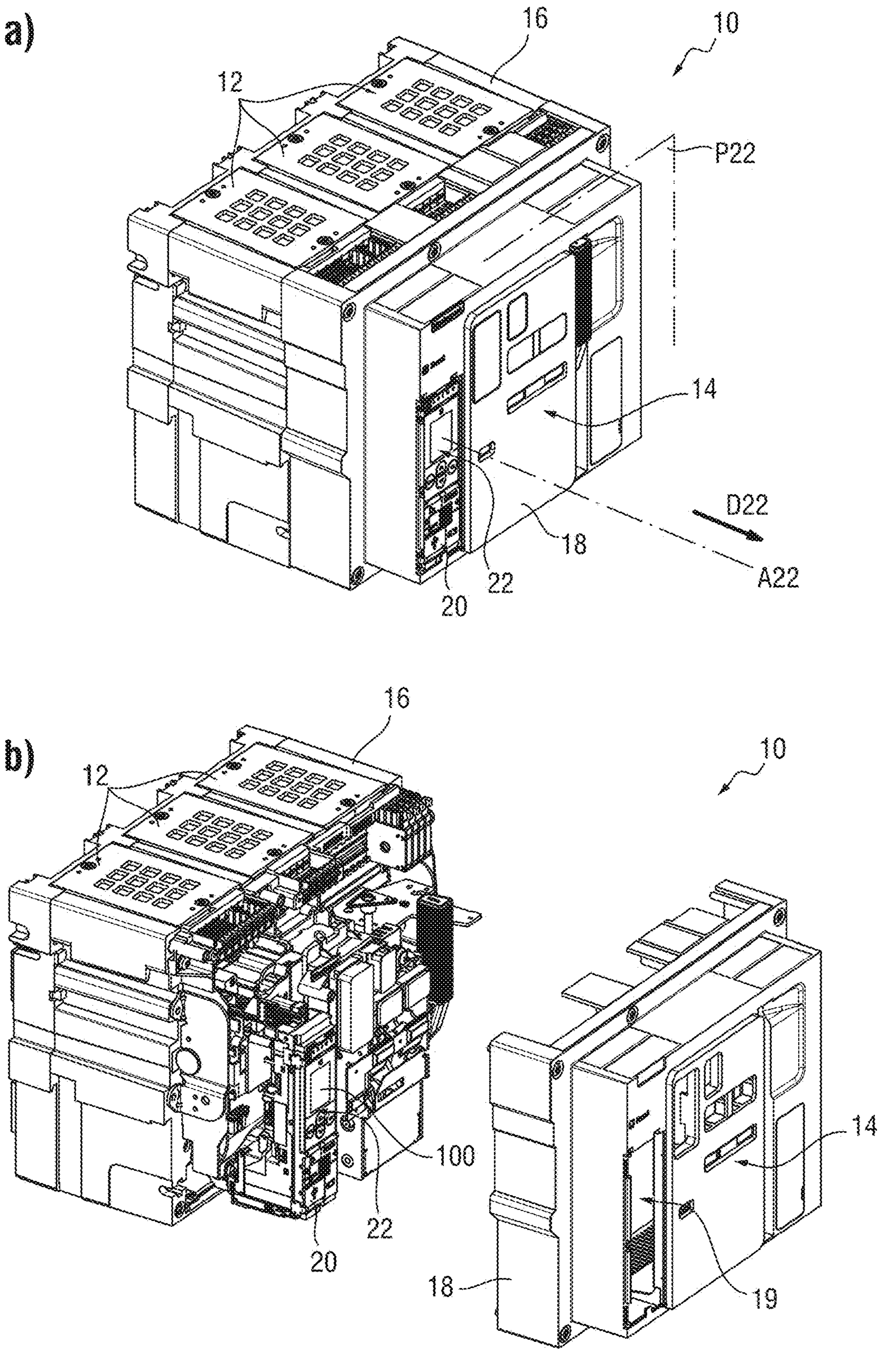
FIG. 1 shows, on two inserts a) and b), respectively, a perspective view and a partially exploded perspective view of an electrical circuit-breaker according to the invention, the electrical circuit-breaker comprising a control unit which is also according to the invention.

An electrical circuit-breaker 10 is shown in FIG. 1. The electrical circuit-breaker 10, also simply called a circuit-breaker 10, is herein a multipole circuit-breaker, more particularly a three-pole circuit-breaker. The number of poles is not limiting. In a known manner, a multipole electric circuit-breaker comprises, for each electric pole, input and output power terminals, which are connected or electrically insulated from each other, respectively, by a cut-off device of the circuit-breaker. The cut-off device comprises e.g. separable movable contacts, which are received in a cut-off chamber of the electric circuit-breaker 10 and the movements of which are controlled by an actuator. Thereby, the shut-off device can be tripped by the actuator. The cut-off chambers are herein embodied by three grids 12 visible on an upper face of the circuit-breaker 10, the other elements of the cut-off device not being shown.

The electrical circuit-breaker 10 is intended to be used within an electrical installation, e.g. to control the power supply to a machine tool. In a normal use configuration, the electrical circuit-breaker 10 is generally placed within an electrical cabinet, the electrical circuit-breaker 10 having a front face 14 which is oriented toward the user standing in front of the electrical cabinet. The electrical cabinet is not shown.

The electric circuit-breaker 10 comprises a cut-off unit 16, which comprises in particular each of the cut-off chambers, as well as the cut-off device and the associated actuator.

The electric circuit-breaker 10 advantageously comprises a faceplate 18 which can be removed from the rest of the cut-off unit 16. The faceplate 18 is made of an electrically insulating material and extends overall along a front plane P14, which defines a portion of the front face 14 of the electric circuit-breaker 10, and by extension of the cut-off unit 16. The faceplate 18 thereby serves to protect the user from the cut-off unit 16. In FIG. 1 a), the faceplate 18 is shown assembled to the cut-off unit 16, which corresponds to a normal use configuration of the circuit-breaker 10. In FIG. 1 *b*), the faceplate 18 is far from the cut-off unit 16, such configuration being existing e.g. during a maintenance of the cut-off unit 16.

The electrical circuit-breaker 10 further comprises a control unit 20. The control unit 20 is configured to analyze states of the cut-off unit 16 and is configured to trip the actuator according to the results of the analyzes, thereby separating the separable contacts.

The control unit 20 comprises a front face 22, the front face 22 has a flat overall shape and is geometrically supported by a front plane P22, which is orthogonal to an axis of depth A22 of the control unit 20. The front panel 22 is oriented toward the user when the control unit 20 is in a normal use configuration. The front face 22 thereby defines a front direction D22, which is parallel to the axis of depth A22. The forward direction D22 is represented by an arrow. The notions of directions such as “front”, “rear”, “up”, “down”, etc., are defined in relation to the elements as represented in the drawings, knowing that in reality, the directions can be different.

The faceplate 18 comprises a window 19 through which the front face 22 of the control unit 20 is visible. The window 19 is preferentially shut off by a transparent flap. The flap is not shown.

Figure 2:
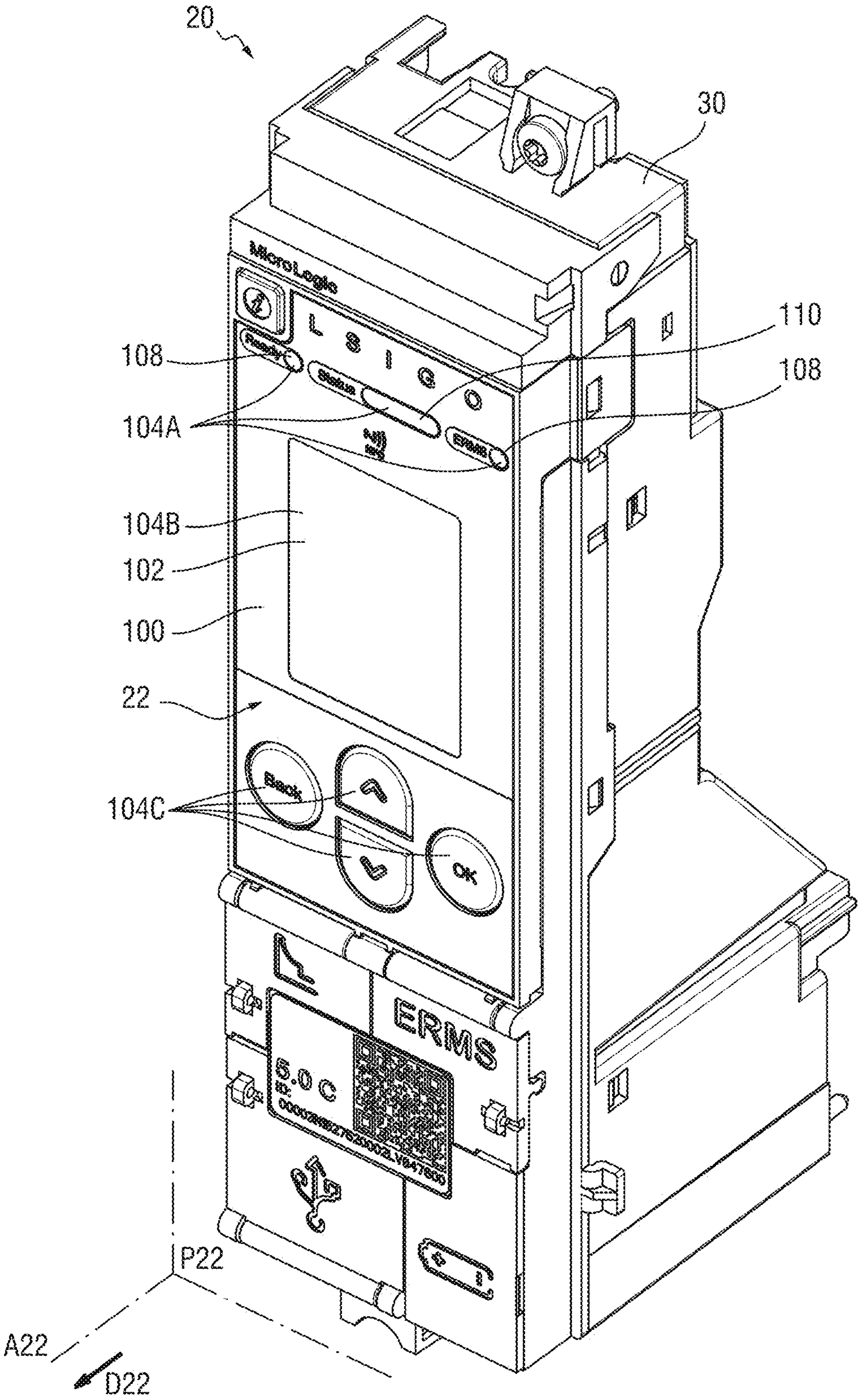
FIG. 2 is a perspective view of the control unit shown in FIG. 1, the control unit comprising a light guide according to a first embodiment of the invention.

The control unit 20 is reversibly assembled to the cut-off unit 16. In the example shown in FIGS. 1*a*) and 1*b*), the control unit 20 is shown in a configuration assembled to the cut-off unit 16. The control unit 20 is shown alone in FIG. 2.

The cut-off unit 16 provides a receptacle which opens out onto a front face 14 of the cut-off unit 16 and wherein the control unit 20 is received, so that the front face 22 of the control unit 20 is substantially aligned with the front face 14 of the cut-off unit 16, as illustrated in particular in FIG. 1*a*). The receptacle is not shown.

The control unit 20 will now be described. The control unit 20 comprises a housing 30, which is made of an insulating material and which forms a volume for receiving various components of the control unit 20, as discussed in detail below.

The housing 30 includes a front subassembly 100. By extension, the subassembly 100 belongs to the control unit 20. The front subassembly 100 comprises a central portion 102, which is generally flat, which has a front side 102A and a rear side opposite the front side 102A.

The central portion 102 is herein configured to receive at least one human-machine interface element 104. The front side 102A of the central portion 102 is preferentially oriented along the front direction D22. A human-machine interface is referred to the acronym HMI thereof. The human-machine interface elements 104 are also denoted simply as “HMI elements” 104. In the example illustrated, the central portion 102 comprises a plurality of HMI elements 104. The HMI elements 104 include herein a plurality of indicator lights 104A, a transparent portion 104B through which a screen can be observed, and a plurality of buttons 104C. Such examples are not limiting; the type, the number and the arrangement of the HMI elements 104 can be changed during the design of the front subassembly 100.

The front subassembly 100 is reversibly assembled to the rest of the control unit 20, more particularly to the housing 30. It is thereby possible to replace the front subassembly 100 in the event of a malfunction. The central portion 102 thereby forms a portion of the front face 22 of the control unit 120.

Figure 3:
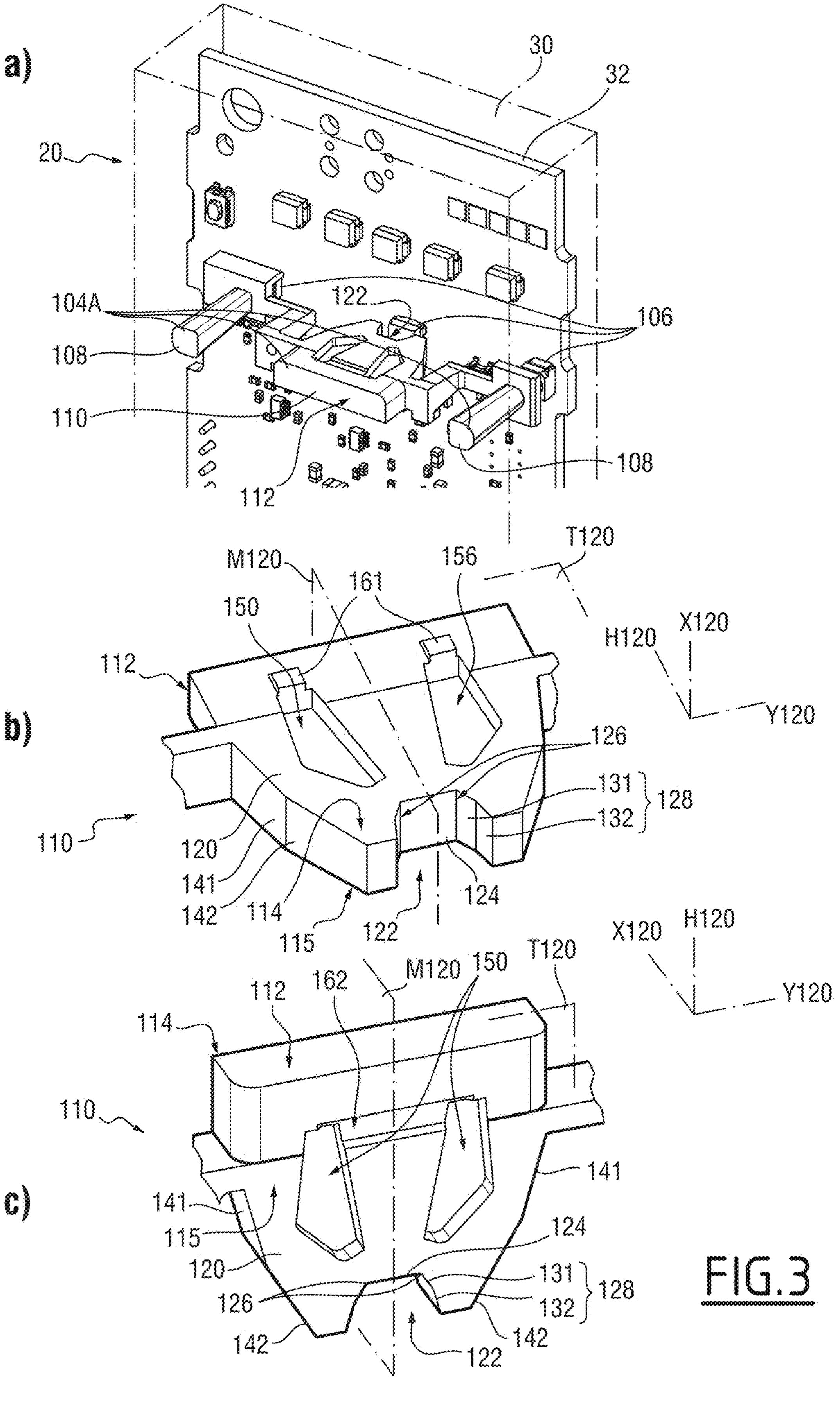
FIG. 3 is a perspective view of the light guide shown in FIG. 2 and of an electronic board of the control unit.

The control unit 20 comprises an electronic board 32, which is housed in the housing 30. In FIG. 3, the housing 30 is shown in transparency, a contour of the housing 30 being shown schematically in dotted lines. The electronic board 32 comprises a printed circuit and a plurality of electronic components such as a microprocessor, one or a plurality of light-emitting diodes, etc. With reference to FIG. 3, each of the indicator lights 104A is herein obtained by means of a light-emitting diode 106, which is mounted on the electronic board 32, which generates a light flux and the light flux of which is guided, as far as the surface 22 of the control unit 20, by a respective light guide 108. Each light guide 108 comprises an exit surface through which the light flux emitted by the corresponding diode 106 exits, thereby forming the corresponding indicator light 104A. The light-emitting diodes 108 are also referred to by the acronym LED thereof. In the context of the present description, light-emitting diodes are simply called “diodes”. In the example illustrated, the electronic board 32 comprises three diodes 106, each of which is associated with a respective light guide 108.

The light guides 108 include an elongate light guide 110 which has an exit surface 112 with an elongate shape. The elongate light guide 110, also called simply as an elongate light guide 110, is located herein between the other two light guides 108.

The elongate guide 110 will now be described.

The elongate light guide 110 comprises a body 120 which is made of an electrically insulating material, the material comprising a matrix having a refractive index n120 comprised between 1.4 and 1.6 and a light transmittance greater than 90% per millimeter. Optionally, other components are added to the material, e.g. fillers, in powder form, to help manufacture the body 120 and/or to modify the optical properties of the material of the body 120. The material of the body 120 is thereby considered to be optically homogeneous and transparent.

The body 120 is advantageously made of a synthetic polymer material which can be injected when hot. Preferred examples of such materials include polycarbonate, denoted by PC, or acrylic polymethyl methacrylate, denoted by PMMA. Polycarbonate has e.g. a refractive index on the order of 1.6, while PMMA has a refractive index on the order of 1.4. Air is considered to have a refractive index equal to 1. The body 120 is advantageously made by hot injection in an injection mold.

In a variant (not shown), the body 120 is made of a mineral material, more particularly a mineral glass. The light guides thereby obtained are of good quality but are more expensive to manufacture.

The body 120 thereby comprises the exit surface 112. The exit surface 112 is preferably flat overall, a normal to the exit surface 112 defining an axis of height H120 of the body 120. The exit surface has herein a substantially rectangular shape, the short sides of the rectangle being parallel to an axis of thickness X120 of the body 120, whereas the long sides of the rectangle are parallel to an axis of width Y120 of the body 120. In the example illustrated, the exit surface 112 has a first dimension, measured along the axis of width Y120 of the body 120, equal to 14 mm, and a second dimension, measured along the axis of thickness X120, equal to 3.2 mm.

In a variant (not illustrated), the exit surface 112 has an oblong, even elliptical shape, etc. The axis of thickness X120, the axis of width Y120 and the axis of height H120 together form an orthogonal coordinate system.

The body 120 advantageously has an overall symmetrical shape with respect to a median plane M120 of the light guide, the median plane M120 being a plane orthogonal to the axis of width Y120.

Herein, the body 120 has an overall the shape of a prism extending along the axis of thickness X120, the body 120 having, in projection in a transverse plane T120 orthogonal to the axis of thickness X120, a cross section with a substantially constant profile.

The body 120 has a front face 114 and a rear face 115, which are parallel to the transverse plane T120 and which are oriented opposite each other, the exit face 112 connecting the front face 114 to the rear face 115.

The cross-section of the body 120 thereby comprising the exit surface 112, as well as an entrance surface 122, which is different from the entrance surface and which is aligned with the exit surface 112 along the axis of height H120.

Figure 4:
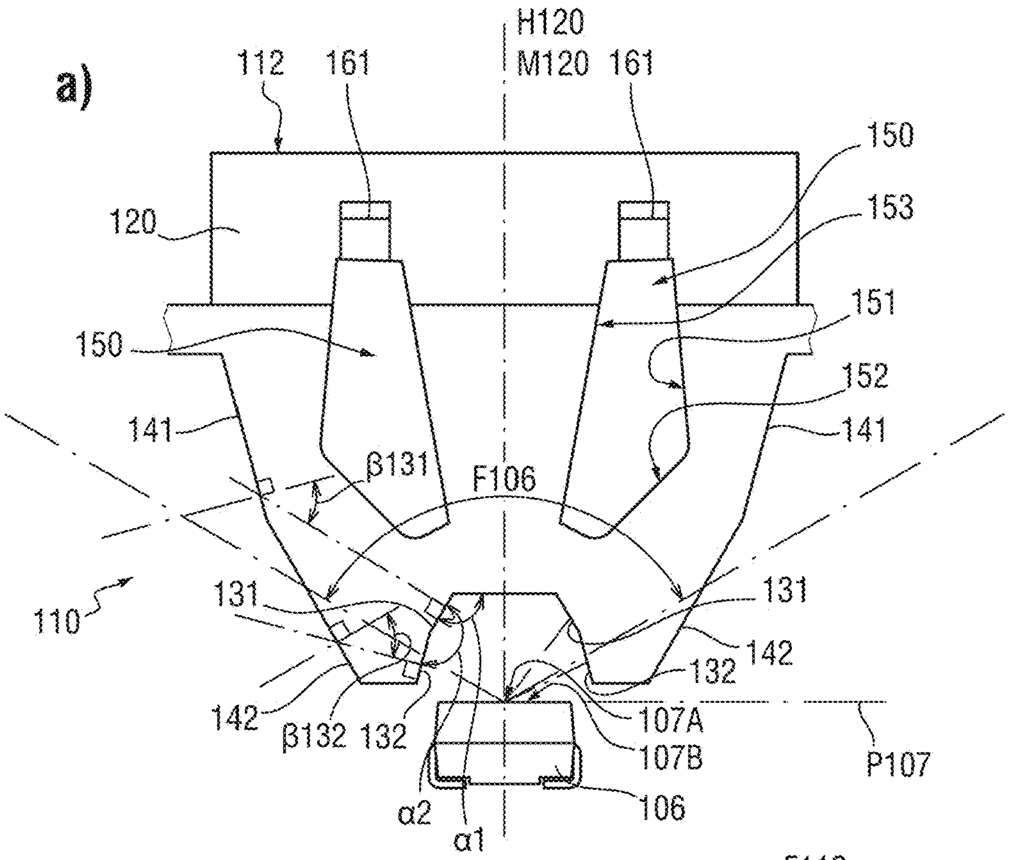
FIG. 4 shows, on two inserts a) and b), a side view of the light guide shown in FIG. 2.
Figure 4:
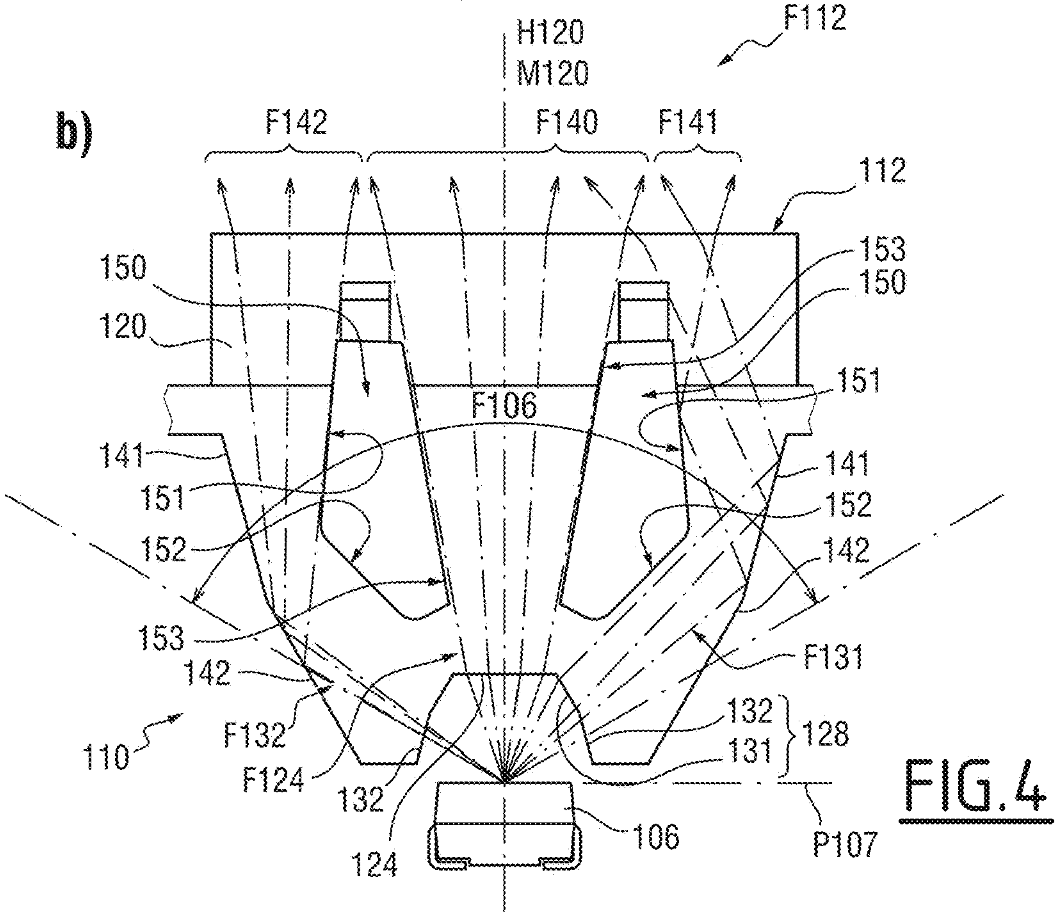

In the normal use configuration, one of the light-emitting diodes 106 of the electronic board 32 is situated opposite the entrance surface 122, as illustrated in FIG. 3 *a*) or in FIG. 4. Schematically, a light-emitting diode of the type of diode 106 considered herein is configured to generate a light flux F106 of substantially conical shape, characterized by an apex angle. In the context of the present invention, the light flux F106 preferentially has an apex angle on the order of 120°. The entrance surface 122 is configured to capture most of the light flux F106 emitted by the opposite light-emitting diode 106. Thereby, the light flux F106 is an incident flux, which is captured by the entrance face 122 and then emerges mainly through the exit surface 112, as explained hereinafter.

Schematically, it is considered that the light flux F106 is emitted by a central point 107A situated on an upper face 107B of the light-emitting diode. The upper face 107B of the diode 106 is arranged orthogonally to the axis of height H120, the central point 107A being aligned with the axis of height H120. It is considered herein that the upper face 107B of the diode 106 is flat overall, knowing that it may be otherwise in reality. The upper face 107B is thereby geometrically supported by an upper plane P107, which is orthogonal to the axis of height H120.

The entrance surface 122 comprises a plurality of faces, each of which is herein flat and which together form the entrance surface 122. Two successive faces of the entrance surface 122 form a non-zero angle therebetween and are arranged in such a way that the entrance surface 122 is concave overall, when viewed from outside the body 120.

The entrance surface 122 herein comprises a central face 124, which is situated astride the median plane M120. The central face 124 has two opposite lateral edges 126 which are parallel to the axis of thickness X120. On each side of the median plane M120, the entrance surface 120 comprises a plurality of lateral faces 128, which extend the central face 124 from the lateral edge 126 situated on the same side of the median plane M120. The central face 124 has herein a rectangular, or even substantially square shape, with sides each having a length of about 2.5 mm. An upper surface of the diode 106 is herein situated about 3 mm from the central face 124.

Herein, the lateral faces 128 include, on each side of the median plane M120, a first lateral face 131 and a second lateral face 132, the first lateral face 131 being interposed between the central face 124 and the second lateral face 132.

On each side of the median plane M120, and in projection in the transverse plane T120, the central face 124, the first lateral face 131 and the second lateral face 132 form angles therebetween configured such that the incident light flux F106 emitted by the diode 106 and passing through the entrance surface 122 is divided, by refraction upon passing the entrance surface 122, into three light fluxes, the three light fluxes including:

- a central flux F124, which corresponds to the portion of the F106 incident light flux refracted upon passing the corresponding portion of the central face 124, the body 120 being configured so that the central flux F124 opens out onto a central portion of the exit surface 112, forming a central outgoing flux F140,
- a first flux F131, which corresponds to the portion of the incident light flux F106 refracted upon passing the first lateral face 131, and
- a second flux F132, which corresponds to the portion of the incident light flux F106 refracted upon passing the second lateral face 132.

The central flux F124, the first flux F131 and the second flux F132 are embodied schematically in FIG. 4 *b*) by a plurality of optical paths shown in chain-dotted lines. Due to the concavity of the entrance face 122, while before passing the entrance surface 122, the incident light flux F160 is considered to be continuous, after passing the entrance surface 122, the central flux F124 and the first flux F131 diverge with respect to each other, while the first flux F131 and the second flux F132 diverge with respect to each other. "Two divergent fluxes" means that the optical paths of each of the two fluxes tend to move away from each other.

The first lateral face 131 forms, with the central face 124, a first angle α1 comprised between 110° and 130°, preferably comprised between 115° and 125°. In the example shown, the first angle α1 is equal to 120°. Herein, the first lateral face 131 has, in projection on the transverse plane T160, a length substantially equal to 1.1 mm.

The second lateral face 132 forms, with the first lateral face 131, a second angle α2 comprised between 150° and 180°, preferably comprised between 160° and 170°. In the example shown, the second angle α2 is equal to 164°. Herein, the second lateral face 132 has, in projection onto the transverse plane T160, a length substantially equal to 1.3 mm. It should be understood that the overall shape of the entrance face can be adjusted in particular according to the size of the diode 106, the distance thereof, etc.

The body 120 also comprises, on each side of the median plane M120, external reflecting faces, which are interposed between the exit surface 112 and the entrance surface 122, each external face being associated with a respective lateral face and being configured to reflect the portion of the light flux associated with the corresponding lateral face toward the exit surface. The external reflecting faces thereby include:

- a first external reflecting face 141, which is associated with the first lateral face 131, and which is configured to reflect the first flux F131 within the light guide 110, so that the first flux F131 thereby reflected opens out essentially onto a first portion of the exit surface, forming a first outgoing flux F141,
- a second external reflecting face 142, which is associated with the second lateral face 132, and which is configured to reflect the second flux F132 inside the light guide 120, so that the first flux F131 thereby reflected opens out essentially onto a second portion of the exit surface 112, forming a second outgoing flux F142.

The central outgoing flux F140, the first outgoing flux F141 and the second outgoing flux F142 together form an outgoing flux F112 of the exit surface 112.

On the exit surface 112, the second portion is interposed between the first portion and the central portion, so that the flux F112 leaving the exit surface 112 is substantially homogeneous, as illustrated schematically in FIG. 4 *a*). In reality, it is advantageous for the central outgoing flux F140, the first outgoing flux F141 and the second outgoing flux F142 to overlap, so as to enhance the apparent homogeneity of the outgoing flux F112.

Advantageously, the exit face 112, the exit surface has a roughness Ra on the order of 1.6 μm, so as to improve the impression of homogeneity of the exit flux F112 leaving the exit surface 112. The body 120 is herein manufactured by hot injection. Each surface of the body 120 thereby has a surface state-more particularly a roughness—which is substantially identical to a surface state of the mold. The roughness of the surfaces of the molds is generally evaluated according to a scale "VDI 3400"—acronym for the German name "Verein Deutscher Ingenieure", or Society of German Engineers—which links the Charmilles index—without unity—and the roughness Ra—in μm—to the surfaces of the molds. The exit face 112 thereby has a surface state which corresponds to a Charmilles index 24.

Advantageously, the entrance surface 122 has a so-called "mirror polished" or "glass-polished" surface. The polished surfaces of plastic parts are usually evaluated according to an "SPI" scale, acronym for the "Society of the Plastics Industry", now renamed "Plastics Industry Association". Within the framework of the present description, the surfaces having a mirror-polished surface state have a surface state SPI of level "A2", which corresponds to a roughness Ra comprised between 0.012 and 0.025 μm.

Preferably, the first external reflecting face 141 is arranged so that the first flux F131 is entirely reflected. Similarly, the second external reflecting face 142 is advantageously arranged so that the second flux F132 is entirely reflected.

In general, the Snell-Descartes law can be used to calculate a limit angle of total reflection $\theta_{lim}$ during reflection at the interface between the material of the body 120 and the air, the limit angle being measured with respect to a vector orthogonal to the considered interface:

$$\theta_{lim} = \sin^{-1}\left(\frac{N_{air}}{N_{120}}\right)$$

where $N_{air}$ is the refractive index of air and $N_{120}$ is the refractive index of the material of the body 120 of the light guide 110.

Applied to the present case, considering that the index of the air $N_{air}$ is equal to 1, a vector orthogonal to the first external reflecting face 141 forms, with a vector orthogonal to the first associated lateral face 131, an angle 3131 greater than the limit reflection angle $\theta_{lim}$ defined by the formula:

$$\theta_{lim} = \sin^{-1}\left(\frac{1}{N_{120}}\right)$$

where $N_{120}$ is the refractive index of the material of the body 120 of the light guide 110.

Similarly, the second external reflecting face 142 is arranged so that the second flux F132 is entirely reflected. Thereby, a vector orthogonal to the second external reflecting face 142 forms, with a vector orthogonal to the associated second lateral face 132, an angle β132 greater than a limit angle of reflection $\theta_{lim}$ defined by the preceding formula:

$$\theta_{lim} = \sin^{-1}\left(\frac{1}{N_{120}}\right)$$

where $N_{120}$ is the refractive index of the material of the body 120 of the light guide 110.

As an illustration, when the refractive index $N_{120}$ is equal to 1.4, the limit angle Olim is on the order of 45°, whereas when the refractive index $N_{120}$ is equal to 1.6, the limit angle $\theta_{lim}$ is on the order of 38°.

Preferably, in projection on the transverse plane, at any point of each lateral face 128, an axis orthogonal to the lateral face 128 intersects the upper plane P107 of the diode 106 beyond the central point 107 A. Due to such arrangement, the first flux F131 and the second flux F132 all form a non-zero angle with, respectively, the axis orthogonal to the first lateral face 131 and the axis orthogonal to the second lateral face 132, which then leads to the reflection of the first flux F131 and of the second flux F132 onto the corresponding external reflecting face 141 or 142 at an angle of incidence smaller than the limit angle $\theta_{lim}$.

The body 120 has recesses 150 which are managed hollowed out on the front face 114 and on the rear face 115 and which are arranged symmetrically with respect to the transverse plane T120. The recesses 150 are thereby associated in pairs, in other words arranged in pairs, each pair being situated on one side of the median plane M120. In the example illustrated, the body 120 comprises two pairs of recesses 150, i.e. in total four recesses 150.

The recesses 150 make it possible to limit the phenomena of sink marks and/or the appearance of bubbles during the cooling of the light guide 110 manufactured by hot injection. In other words, the recesses contribute to improving the optical quality of the light guide, in particular improving the homogeneity of the intensity of light on the exit face 112.

As explained hereinabove, the specific shape of the entrance face 122 means that the light flux F106 is divided into three divergent fluxes F124, F131 and F132. The reflections on the external faces 141 and 142 mean that certain zones inside the body 120, called "dead zones", are crossed through by few light rays. The recesses 150 are thereby arranged in the dead zones, so as to limit the loss of intensity of light of the outgoing flux F140.

Each recess 150 has, in projection onto the transverse plane T120, a profile defining three main sides. The three major sides form a triangle and include:

- a first side 151, which is delimited by the first flux F131 after reflection onto the first external face 141,
- a second side 152, which is delimited by the second flux F132 after reflection on the second external face 142, and
- a third side 153, which is delimited by the central flux F124 between the central face 124 and the exit surface 112.

Advantageously, the first side 151 of each recess 150 is polished, in other words has a "mirror-polished" surface, so as to reflect the first flux F131 after reflection on the first external reflecting face 141, as illustrated in FIG. 4 *b*). Preferably, the first side 151, the second side 152 and the third side 153 are each polished. Preferably, the entire contour of each recess 150 is polished.

Figure 5:
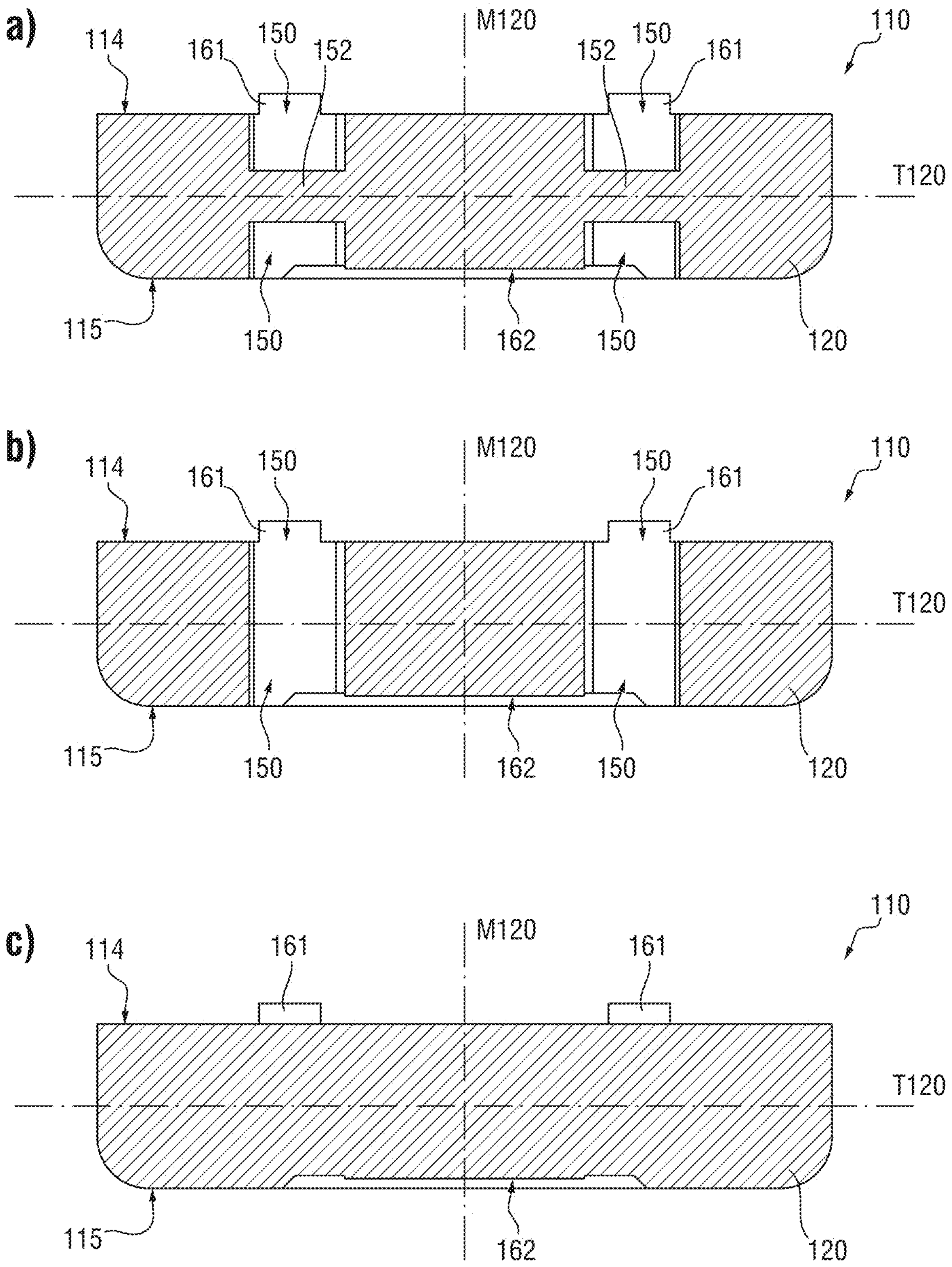
FIG. 5 shows, on three inserts a) and b), c), a section of the light guide shown in FIG. 2 and of light guides according to other embodiments of the invention.

The recesses 150 are preferably partial, i.e. the recesses 150 of the same pair provide therebetween a thinned portion 152 of the body 120, the thinned portion 152 being situated astride the transverse plane T120, as illustrated in FIG. 5 *a*). The thinned portion 152 thereby forms a bottom of the recesses 150 of the corresponding pair. The thinned portion 152 has a thickness, measured along the axis of thickness, comprised between 20 and 50% of a total thickness of the body, preferably comprised between 30 and 40%, else more preferably substantially equal to 33%. Advantage is taken thereby of the improvement in the optical quality of the light guide 110, while limiting the loss of intensity of light of the outgoing flux F140.

In a variant, the recesses 150 are through and connect the front face 114 to the rear face 115, through the body 120, as shown in FIG. 5 *b*). The body 120 then does not comprise any thinned portion such as the thinned portion 152 described hereinabove.

According to another variant, the body 120 does not comprise any recess such as the recesses 150 described hereinabove, as shown in FIG. 5 *c*).

In the examples illustrated, the body 120 comprises attachment members. The attachment members 160 are provided for facilitating the assembly of the light guide 110 to the front subassembly 100 and include herein protrusions 161 and a recess 162, which are provided in the front face 114 and the rear face 115, respectively.

Figure 6:
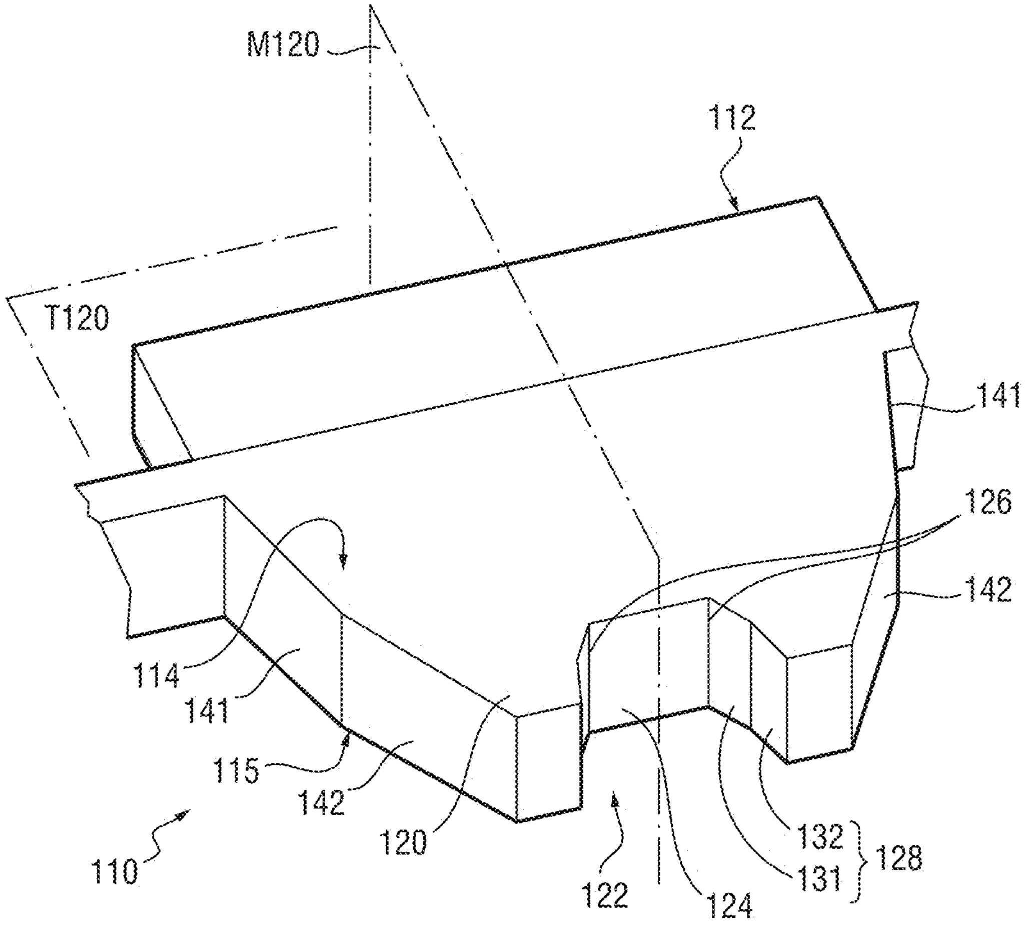
FIG. 6 is a perspective view of a light guide according to another embodiment of the invention.

In a variant, the front 114 or rear 115 faces do not comprise any protrusion or recess such as the protrusions 161 or the recess 162 described hereinabove, as illustrated in FIG. 6.

In the examples illustrated, the exit surface 112 is substantially flat. In a variant (not shown), the exit surface is curved, e.g. convex.

In the example illustrated, the control unit 20 of the electrical circuit-breaker 10 is an example of an electrical device using the elongate light guide 110. Of course, the principles of the invention can be transposed to other types of electrical devices, the elongate light guide 110 being particularly suitable for applications requiring both low energy consumption and/or a minimum isolation distance between the electrified components and the user.

The aforementioned embodiments and variants can be combined with each other so as to generate new embodiments of the invention.

The invention claimed is:

1. A light guide for an electrical device, the light guide comprising a body, made of an electrically insulating material, the material comprising a matrix having an refractive index comprised between 1.4 and 1.6 and a light transmission coefficient greater than 90% per millimeter, the body having a prism shape extending along an axis of thickness, the body having, in projection in a plane transverse to the axis of thickness, a section comprising:

- an exit surface, geometrically supported by a plane orthogonal to an axis of height and having an elongate shape along an axis of width, the axis of width being orthogonal to the axis of height, the axis of thickness, the axis of width and the axis of height together forming an orthogonal coordinate system,
- an entrance surface, configured to capture an incident light flux emitted by a light-emitting diode when the light-emitting diode is located opposite the entrance surface, the entrance surface being aligned with the exit surface along the axis of height, so that the captured light flux emerges mainly from the exit surface,
- the body having a symmetrical shape with respect to a median plane of the light guide, the median plane being orthogonal to the axis of width, wherein:

- the entrance surface comprises:
  - a central face, which lies astride the median plane, the central face having two opposite lateral edges, which are parallel to the axis of thickness, and
  - on each side of the median plane, a plurality of lateral faces, which continue the central face from the lateral edge on the same side of the median plane, the lateral faces including a first lateral face and a second lateral face, the first lateral face being interposed between the central face and the second lateral face,
- on each side of the median plane, and in projection in the transverse plane, the central face, the first lateral face and the second lateral face forming angles therebetween configured such that the incident light flux emitted by the light-emitting diode and passing through the entrance surface is divided, by refraction upon passing the entrance surface, into three distinct light fluxes, the three light fluxes including:
  - a central flux, which corresponds to the portion of the incident light flux refracted upon passing the corresponding portion of the central face, the body being configured so that the central flux opens out onto a central portion of the exit surface, forming a central outgoing flux, a first flux, corresponding to the portion of the incident light flux refracted upon passing the first lateral face, a second flux, corresponding to the portion of the incident light flux refracted when passing the second lateral face, the body also comprising, on each side of the median plane, external reflecting faces which are interposed between the exit surface and the entrance surface, each external face being associated with a respective lateral face and being configured to reflect the portion of the light flux associated with the corresponding lateral face toward the exit surface, the external reflecting faces including:

a first external reflecting face, associated with the first lateral face, and configured to reflect the first flux within the light guide, so that the first flux thereby reflected opens out onto a first portion of the exit surface, forming a first outgoing flux, a second external reflecting face, associated with the second lateral face, and configured to reflect the second flux inside the light guide (110, so that the first flux thereby reflected opens out onto a second portion of the exit surface, forming a second outgoing flux, the central outgoing flux, the first outgoing flux and the second outgoing flux together forming an outgoing flux of the exit surface, and on the exit surface, the second portion being interposed between the first portion and the central portion.

2. The light guide according to claim 1, wherein:

a vector orthogonal to each external reflecting face forms, with an axis orthogonal to the associated lateral face, an angle, greater than a limit angle of reflection $\theta_{lim}$ defined by the formula:

$$\theta_{lim} = \sin^{-1}\left(\frac{1}{N_{120}}\right),$$

where $N_{120}$ is the refractive index of the material of the body of the light guide.

3. The light guide according to claim 1, wherein:

the first lateral face forms with the central face an angle comprised between 110° and 130°, and the second lateral face forms with the first lateral face an angle comprised between 150° and 180°.

4. The light guide according to claim 1, wherein:

the body is made of a synthetic, hot-injectable polymer material.

5. The light guide according to claim 4, wherein:

the body is made of polycarbonate or acrylic polymethyl methacrylate.

6. The light guide according to claim 1, wherein:

the body has a front face and a rear face, which are parallel to the transverse plane and which are oriented opposite each other, the exit face connecting the front face to the rear face, on at least one side of the median plane, the body has a pair of recesses, provided on the front side and on the rear side and are arranged symmetrically with respect to the transverse plane, and each recess has, in projection onto the transverse plane, a profile defining three main sides, which include:

a first side, delimited by the first flux after reflection onto the first external face, a second side, delimited by the second flux after reflection on the second external face, and a third side, delimited by the central flux between the central face and the exit surface.

7. The light guide according to claim 6, wherein:

the recesses of the same pair form therebetween a thinned portion of the body, and the thinned portion has a thickness, measured along the axis of thickness, comprised between 20 and 50% of a total thickness of the body.

8. The light guide according to claim 7, wherein:

the thinned portion has a thickness comprised between 30 and 40% of the total thickness of the body.

9. The light guide according to claim 7, wherein:

the thinned portion has a thickness equal to 33% of the total thickness of the body.

10. The light guide according to claim 6, wherein:

the recesses extend through and connect the front face to the rear face through the body.

11. The light guide according to claim 6, wherein:

the first side of each recess is polished so as to reflect the first flux after reflection from the first external face.

12. An electrical device, comprising:

a housing, made of an insulating material and having a front face, a light-emitting diode received in the housing, and the light guide according to claim 1, the exit surface opening out onto the front face of the housing, while the entrance surface is situated opposite the light-emitting diode.

13. The electrical device according to claim 12, wherein:

the electrical device is a control unit of an electrical circuit-breaker, the front face being configured to be oriented toward a user when the control unit is in a normal use configuration.

14. An electrical circuit-breaker, comprising:

a cut-off unit, comprising at least one cut-off device and one actuator, where the cut-off device can be tripped by means of the one actuator, and the electrical device according to claim 13, wherein:

the cut-off unit forms a receptacle, which opens out onto a front face of the cut-off unit, and the control unit being received in the receptacle of the cut-off unit, so that the front face of the control unit is aligned with the front face of the cut-off unit.

* * * * *